US008645988B2

(12) United States Patent
Candelore

(10) Patent No.: US 8,645,988 B2
(45) Date of Patent: Feb. 4, 2014

(54) CONTENT PERSONALIZATION FOR DIGITAL CONTENT

(75) Inventor: Brant L. Candelore, San Diego, CA (US)

(73) Assignees: Sony Corporation, Tokyo (JP); Sony Electronics Inc

( * ) Notice: Subject to any disclaimer, the term of this patent is extended or adjusted under 35 U.S.C. 154(b) by 891 days.

(21) Appl. No.: 11/371,479

(22) Filed: Mar. 9, 2006

(65) Prior Publication Data

US 2006/0174264 A1 Aug. 3, 2006

Related U.S. Application Data

(63) Continuation-in-part of application No. 10/319,066, filed on Dec. 13, 2002, now Pat. No. 7,765,567.

(51) Int. Cl.
H04N 7/10 (2006.01)
H04N 7/025 (2006.01)
G06F 3/00 (2006.01)
G06F 13/00 (2006.01)
H04N 5/445 (2011.01)

(52) U.S. Cl.
USPC ................... 725/32; 725/34; 725/46

(58) Field of Classification Search
USPC ........ 725/32, 34, 68, 100, 131, 139, 147, 151
See application file for complete search history.

(56) References Cited

U.S. PATENT DOCUMENTS

| 3,852,519 A | 12/1974 | Court ............................. 178/5.1 |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. .................... 380/15 |

(Continued)

FOREIGN PATENT DOCUMENTS

| CA | 2389247 | 5/2001 |
| CA | 2328645 | 7/2001 |

(Continued)

OTHER PUBLICATIONS

"Ad Agencies and Advertisers to be Empowered with Targeted Ad Delivered by Television's Prevailing Video Servers", *Article Business Section of the New York Times*, (Dec. 20, 2001).

(Continued)

*Primary Examiner* — Nasser Goodarzi
*Assistant Examiner* — Mary A Kay
(74) *Attorney, Agent, or Firm* — Blakely Sokoloff Taylor & Zafman, LLP

(57) ABSTRACT

A method of providing personalized content to a user is disclosed. In particular, the method relates to receiving incoming content that includes primary content being content originally intended for use in a program and personalized replacement content being content for replacing the primary content in the program. If the personalized replacement content is determined to be more appropriate than the primary content, based upon personalization parameters, then the primary content is substituted with the personalized replacement content.

12 Claims, 9 Drawing Sheets

(56) References Cited

U.S. PATENT DOCUMENTS

| | | |
|---|---|---|
| 4,772,947 A | 9/1988 | Kono |
| 4,785,361 A | 11/1988 | Brotby |
| 4,788,589 A | 11/1988 | Kondo |
| 4,802,215 A | 1/1989 | Mason .................... 380/21 |
| 4,803,725 A | 2/1989 | Horne et al. ................ 380/44 |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,924,310 A | 5/1990 | von Brandt |
| 4,944,006 A | 7/1990 | Citta et al. .................... 380/20 |
| 4,953,023 A | 8/1990 | Kondo |
| 4,989,245 A | 1/1991 | Bennett |
| 4,995,080 A | 2/1991 | Bestler et al. .................. 380/21 |
| 5,018,197 A | 5/1991 | Jones et al. .................... 380/20 |
| 5,023,710 A | 6/1991 | Kondo et al. |
| 5,091,936 A | 2/1992 | Katznelson et al. ........... 380/19 |
| 5,122,873 A | 6/1992 | Golin |
| 5,124,117 A | 6/1992 | Tatebayashi et al. |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. .................. 380/9 |
| 5,258,835 A | 11/1993 | Kato |
| 5,319,707 A | 6/1994 | Wasilewski et al. |
| 5,325,432 A | 6/1994 | Gardeck et al. ................ 380/21 |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,416,651 A | 5/1995 | Uetake et al. |
| 5,416,847 A | 5/1995 | Boze |
| 5,420,866 A | 5/1995 | Wasilewski ................ 370/110.1 |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan ...................... 380/25 |
| 5,539,823 A | 7/1996 | Martin et al. .................... 380/20 |
| 5,539,828 A | 7/1996 | Davis |
| 5,555,305 A | 9/1996 | Robinson et al. ............... 380/14 |
| 5,561,713 A | 10/1996 | Suh ................ 380/10 |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,594,507 A | 1/1997 | Hoarty |
| 5,598,214 A | 1/1997 | Kondo et al. |
| 5,600,721 A | 2/1997 | Kitazato |
| 5,606,359 A | 2/1997 | Youden et al. ................... 387/7 |
| 5,608,448 A | 3/1997 | Smoral et al. ................... 348/7 |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Dillon et al. |
| 5,663,764 A | 9/1997 | Kondo et al. |
| 5,666,293 A | 9/1997 | Metz et al. |
| 5,699,429 A | 12/1997 | Tamer et al. |
| 5,703,889 A | 12/1997 | Shimoda et al. |
| 5,717,814 A | 2/1998 | Abecassis ................... 386/46 |
| 5,732,346 A | 3/1998 | Lazaridis et al. |
| 5,742,680 A | 4/1998 | Wilson ........................ 380/16 |
| 5,742,681 A | 4/1998 | Giachetti et al. ............... 380/20 |
| 5,751,280 A | 5/1998 | Abbott et al. .................. 345/302 |
| 5,751,743 A | 5/1998 | Takizawa |
| 5,751,813 A | 5/1998 | Dorenbos .................... 380/49 |
| 5,754,650 A | 5/1998 | Katznelson .................... 380/15 |
| 5,757,417 A | 5/1998 | Aras et al. ..................... 348/10 |
| 5,757,909 A | 5/1998 | Park |
| 5,768,539 A | 6/1998 | Metz et al. |
| 5,784,464 A | 7/1998 | Akiyama et al. |
| 5,787,171 A | 7/1998 | Kubota et al. |
| 5,787,179 A | 7/1998 | Ogawa et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. ................. 380/10 |
| 5,805,712 A | 9/1998 | Davis |
| 5,805,762 A | 9/1998 | Boyce et al. |
| 5,809,147 A | 9/1998 | De Lange et al. ............... 380/28 |
| 5,815,146 A | 9/1998 | Youden et al. ................. 345/327 |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette .................... 348/7 |
| 5,894,516 A | 4/1999 | Brandenburg .................... 380/4 |
| 5,897,218 A | 4/1999 | Nishimura et al. ............. 386/94 |
| 5,915,018 A | 6/1999 | Aucsmith ........................ 380/4 |
| 5,917,830 A | 6/1999 | Chen et al. |
| 5,917,915 A | 6/1999 | Hirose |
| 5,922,048 A | 7/1999 | Emura .......................... 709/219 |
| 5,923,486 A | 7/1999 | Sugiyama et al. |
| 5,923,755 A | 7/1999 | Birch |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,973,679 A | 10/1999 | Abbott et al. .................. 345/302 |
| 5,973,722 A | 10/1999 | Wakai et al. |
| 5,999,622 A | 12/1999 | Yasukawa et al. ................ 380/4 |
| 5,999,698 A | 12/1999 | Nakai et al. ................... 386/125 |
| 6,002,393 A | 12/1999 | Hite et al. |
| 6,005,561 A | 12/1999 | Hawkins et al. ............... 345/327 |
| 6,011,849 A | 1/2000 | Orrin ........................... 380/42 |
| 6,012,144 A | 1/2000 | Pickett ........................ 713/201 |
| 6,021,199 A | 2/2000 | Ishibashi ........................ 380/10 |
| 6,021,201 A | 2/2000 | Bakhle et al. |
| 6,026,164 A | 2/2000 | Sakamoto et al. |
| 6,028,932 A | 2/2000 | Park |
| 6,029,045 A * | 2/2000 | Picco et al. ...................... 725/34 |
| 6,049,613 A | 4/2000 | Jakobsson ..................... 380/47 |
| 6,055,314 A | 4/2000 | Spies et al. |
| 6,055,315 A | 4/2000 | Doyle et al. |
| 6,057,872 A | 5/2000 | Candelore ....................... 348/3 |
| 6,058,186 A | 5/2000 | Enari ............................. 380/10 |
| 6,058,192 A | 5/2000 | Guralnick et al. |
| 6,061,451 A | 5/2000 | Muratani et al. |
| 6,064,748 A | 5/2000 | Hogan ........................ 382/100 |
| 6,065,050 A | 5/2000 | DeMoney ..................... 709/219 |
| 6,069,647 A | 5/2000 | Sullivan et al. |
| 6,072,872 A | 6/2000 | Chang et al. |
| 6,072,873 A | 6/2000 | Bewick ........................ 380/217 |
| 6,073,122 A | 6/2000 | Wool |
| 6,088,450 A | 7/2000 | Davis et al. |
| 6,105,134 A | 8/2000 | Pinder et al. |

(56) References Cited

U.S. PATENT DOCUMENTS

| | | |
|---|---|---|
| 6,108,422 A | 8/2000 | Newby et al. |
| 6,115,821 A | 9/2000 | Newby et al. |
| 6,115,851 A | 9/2000 | Maseruka |
| 6,118,873 A | 9/2000 | Lotspiech et al. |
| 6,134,551 A | 10/2000 | Aucsmith |
| 6,138,237 A | 10/2000 | Ruben et al. |
| 6,154,206 A | 11/2000 | Ludtke |
| 6,157,719 A | 12/2000 | Wasilewski et al. |
| 6,181,334 B1 | 1/2001 | Freeman et al. |
| 6,185,369 B1 | 2/2001 | Ko et al. ............... 386/125 |
| 6,185,546 B1 | 2/2001 | Davis |
| 6,189,096 B1 | 2/2001 | Haverty |
| 6,192,131 B1 | 2/2001 | Geer, Jr. et al. |
| 6,199,053 B1 | 3/2001 | Herbert et al. |
| 6,204,843 B1 | 3/2001 | Freeman et al. ............ 345/327 |
| 6,209,098 B1 | 3/2001 | Davis |
| 6,215,484 B1 | 4/2001 | Freeman et al. ............ 345/327 |
| 6,226,618 B1 | 5/2001 | Downs et al. |
| 6,229,895 B1 | 5/2001 | Son et al. ............... 380/200 |
| 6,230,194 B1 | 5/2001 | Frailong et al. |
| 6,230,266 B1 | 5/2001 | Perlman et al. |
| 6,233,577 B1 | 5/2001 | Ramasubramani et al. |
| 6,236,727 B1 | 5/2001 | Ciacelli et al. |
| 6,240,553 B1 | 5/2001 | Son et al. ............... 725/95 |
| 6,246,720 B1 | 6/2001 | Kutner et al. |
| 6,247,127 B1 | 6/2001 | Vandergeest ............ 713/100 |
| 6,256,747 B1 | 7/2001 | Inohara et al. |
| 6,263,506 B1 | 7/2001 | Ezaki et al. |
| 6,266,416 B1 | 7/2001 | Sigbjornsen et al. |
| 6,266,480 B1 | 7/2001 | Ezaki et al. |
| 6,272,538 B1 | 8/2001 | Holden et al. |
| 6,278,783 B1 | 8/2001 | Kocher et al. |
| 6,289,455 B1 | 9/2001 | Kocher et al. |
| 6,292,568 B1 | 9/2001 | Akins et al. ............ 380/239 |
| 6,292,892 B1 | 9/2001 | Davis |
| 6,307,939 B1 | 10/2001 | Vigarie ............... 380/210 |
| 6,311,012 B1 | 10/2001 | Cho et al. ............ 386/98 |
| 6,314,569 B1 * | 11/2001 | Chernock et al. ............ 725/37 |
| 6,324,288 B1 | 11/2001 | Hoffman |
| 6,330,672 B1 | 12/2001 | Shur ............... 713/176 |
| 6,351,538 B1 | 2/2002 | Uz |
| 6,377,589 B1 | 4/2002 | Knight et al. |
| 6,378,130 B1 | 4/2002 | Adams |
| 6,389,533 B1 | 5/2002 | Davis et al. |
| 6,389,537 B1 | 5/2002 | Davis et al. |
| 6,415,031 B1 | 7/2002 | Colligan et al. ............ 380/200 |
| 6,415,101 B1 | 7/2002 | deCarmo et al. ............ 386/105 |
| 6,424,717 B1 | 7/2002 | Pinder et al. |
| 6,430,361 B2 | 8/2002 | Lee ............... 386/98 |
| 6,442,689 B1 | 8/2002 | Kocher |
| 6,445,738 B1 | 9/2002 | Zdepski et al. |
| 6,449,718 B1 | 9/2002 | Rucklidge et al. ............ 713/168 |
| 6,453,115 B1 | 9/2002 | Boyle |
| 6,456,985 B1 | 9/2002 | Ohtsuka |
| 6,459,427 B1 | 10/2002 | Mao et al. ............ 345/327 |
| 6,463,152 B1 | 10/2002 | Takahashi ............ 380/201 |
| 6,466,671 B1 | 10/2002 | Maillard et al. |
| 6,477,649 B2 | 11/2002 | Kambayashi et al. |
| 6,505,032 B1 | 1/2003 | McCorkle et al. ............ 455/41 |
| 6,510,554 B1 | 1/2003 | Gordon et al. ............ 725/90 |
| 6,519,693 B1 | 2/2003 | Debey |
| 6,529,526 B1 | 3/2003 | Schneidewend |
| 6,543,053 B1 | 4/2003 | Li et al. ............ 725/88 |
| 6,549,229 B1 | 4/2003 | Kirby et al. |
| 6,550,008 B1 | 4/2003 | Zhang et al. |
| 6,557,031 B1 | 4/2003 | Mimura et al. |
| 6,587,561 B1 | 7/2003 | Sered et al. ............ 380/241 |
| 6,590,979 B1 | 7/2003 | Ryan |
| 6,609,039 B1 | 8/2003 | Schoen ............... 700/94 |
| 6,640,145 B2 | 10/2003 | Hoffberg et al. |
| 6,640,305 B2 | 10/2003 | Kocher et al. |
| 6,643,298 B1 | 11/2003 | Brunheroto et al. |
| 6,650,754 B2 | 11/2003 | Akiyama et al. |
| 6,654,389 B1 | 11/2003 | Brunheroto et al. |
| 6,678,740 B1 | 1/2004 | Rakib et al. ............ 9/247 |
| 6,681,326 B2 | 1/2004 | Son et al. ............ 713/150 |
| 6,697,489 B1 | 2/2004 | Candelore |
| 6,697,944 B1 | 2/2004 | Jones et al. |
| 6,698,020 B1 | 2/2004 | Zigmond et al. |
| 6,707,696 B1 | 3/2004 | Turner et al. |
| 6,718,551 B1 | 4/2004 | Swix et al. |
| 6,732,367 B1 * | 5/2004 | Ellis et al. ............ 725/27 |
| 6,754,276 B1 | 6/2004 | Harumoto et al. |
| 6,772,340 B1 | 8/2004 | Peinado et al. |
| 6,788,690 B2 | 9/2004 | Harri |
| 6,816,703 B1 * | 11/2004 | Wood et al. ............ 455/3.04 |
| 6,826,185 B1 | 11/2004 | Montanaro et al. |
| 6,904,520 B1 | 6/2005 | Rosset et al. |
| 6,976,166 B2 | 12/2005 | Herley et al. |
| 7,010,685 B1 | 3/2006 | Candelore |
| 7,039,938 B2 | 5/2006 | Candelore |
| 7,058,806 B2 | 6/2006 | Smeets et al. |
| 7,120,250 B2 | 10/2006 | Candelore |
| 7,124,303 B2 | 10/2006 | Candelore et al. |
| 7,124,938 B1 | 10/2006 | Marsh |
| 7,139,398 B2 | 11/2006 | Candelore et al. |
| 7,146,007 B1 | 12/2006 | Maruo et al. |
| 7,146,627 B1 | 12/2006 | Ismail et al. |
| 7,151,831 B2 | 12/2006 | Candelore et al. |
| 7,155,012 B2 | 12/2006 | Candelore et al. |
| 7,242,766 B1 | 7/2007 | Lyle |
| 7,254,234 B2 | 8/2007 | Sugahara et al. |
| 7,500,258 B1 | 3/2009 | Eldering |
| 8,051,443 B2 | 11/2011 | Candelore et al. |
| 2001/0030959 A1 | 10/2001 | Ozawa et al. |
| 2001/0042043 A1 | 11/2001 | Shear et al. |
| 2002/0013943 A1 | 1/2002 | Haberman et al. |
| 2002/0021805 A1 | 2/2002 | Schumann et al. |
| 2002/0026587 A1 | 2/2002 | Talstra et al. |
| 2002/0044658 A1 | 4/2002 | Wasilewski et al. |
| 2002/0046406 A1 | 4/2002 | Chelehmal et al. ............ 725/87 |
| 2002/0047915 A1 | 4/2002 | Misu |
| 2002/0056093 A1 | 5/2002 | Kunkel et al. |
| 2002/0059425 A1 | 5/2002 | Belfiore et al. ............ 709/226 |
| 2002/0083438 A1 | 6/2002 | So et al. |
| 2002/0083439 A1 | 6/2002 | Eldering |
| 2002/0090090 A1 | 7/2002 | Van Rijnsoever et al. |
| 2002/0094084 A1 | 7/2002 | Wasilewski et al. |
| 2002/0097322 A1 | 7/2002 | Monroe et al. |
| 2002/0108035 A1 | 8/2002 | Herley et al. ............ 713/165 |
| 2002/0109707 A1 | 8/2002 | Lao et al. |
| 2002/0129243 A1 | 9/2002 | Nanjundiah ............ 713/160 |
| 2002/0144626 A1 | 10/2002 | Schut |
| 2002/0150239 A1 | 10/2002 | Carny et al. |
| 2002/0170053 A1 | 11/2002 | Peterka et al. |
| 2002/0184506 A1 | 12/2002 | Perlman |
| 2002/0188567 A1 | 12/2002 | Candelore |
| 2002/0194613 A1 | 12/2002 | Unger ............... 725/118 |
| 2002/0196939 A1 | 12/2002 | Unger et al. ............ 380/216 |
| 2003/0009669 A1 | 1/2003 | White et al. |
| 2003/0021412 A1 | 1/2003 | Candelore et al. ............ 380/217 |
| 2003/0026423 A1 | 2/2003 | Unger et al. |
| 2003/0026523 A1 | 2/2003 | Chua et al. |
| 2003/0035540 A1 | 2/2003 | Freeman et al. |
| 2003/0035543 A1 | 2/2003 | Gillon et al. |
| 2003/0046686 A1 | 3/2003 | Candelore et al. |
| 2003/0063613 A1 | 4/2003 | Iuoma et al. ............ 370/401 |
| 2003/0072555 A1 | 4/2003 | Yap et al. |
| 2003/0081630 A1 | 5/2003 | Mowery et al. |
| 2003/0081776 A1 | 5/2003 | Candelore ............ 380/200 |
| 2003/0084284 A1 | 5/2003 | Ando et al. |
| 2003/0084457 A1 * | 5/2003 | Lee et al. ............ 725/117 |
| 2003/0097662 A1 | 5/2003 | Russ et al. |
| 2003/0104717 A1 | 6/2003 | Hayakawa |
| 2003/0108199 A1 | 6/2003 | Pinder et al. |
| 2003/0115595 A1 * | 6/2003 | Stevens et al. ............ 725/32 |
| 2003/0123664 A1 | 7/2003 | Pedlow, Jr. et al. ............ 380/218 |
| 2003/0123849 A1 | 7/2003 | Nallur et al. ............ 386/68 |
| 2003/0133570 A1 | 7/2003 | Candelore et al. ............ 380/210 |
| 2003/0145329 A1 | 7/2003 | Candelore ............ 725/87 |
| 2003/0149475 A1 | 8/2003 | Hyodoh et al. |
| 2003/0152224 A1 | 8/2003 | Candelore et al. ............ 380/210 |
| 2003/0152226 A1 | 8/2003 | Candelore et al. ............ 380/218 |
| 2003/0156718 A1 | 8/2003 | Candelore et al. ............ 380/211 |

(56) References Cited

U.S. PATENT DOCUMENTS

| | | |
|---|---|---|
| 2003/0157140 A1 | 8/2003 | Takada |
| 2003/0159139 A1 | 8/2003 | Candelore et al. ............... 725/25 |
| 2003/0159150 A1 | 8/2003 | Candelore ........................ 725/31 |
| 2003/0159152 A1 | 8/2003 | Lin et al. ......................... 725/87 |
| 2003/0172381 A1* | 9/2003 | Janevski .......................... 725/46 |
| 2003/0174837 A1 | 9/2003 | Candelore et al. ............. 380/210 |
| 2003/0174844 A1 | 9/2003 | Candelore |
| 2003/0188164 A1 | 10/2003 | Okimoto et al. |
| 2003/0190054 A1 | 10/2003 | Troyansky et al. |
| 2003/0198223 A1 | 10/2003 | Mack et al. .................... 370/392 |
| 2003/0204717 A1 | 10/2003 | Kuehnel |
| 2003/0222994 A1 | 12/2003 | Dawson |
| 2003/0226149 A1 | 12/2003 | Chun et al. ....................... 725/78 |
| 2004/0003008 A1 | 1/2004 | Wasilewski et al. ........... 707/200 |
| 2004/0037421 A1 | 2/2004 | Truman |
| 2004/0047470 A1 | 3/2004 | Candelore ...................... 380/240 |
| 2004/0049688 A1 | 3/2004 | Candelore et al. ............. 713/191 |
| 2004/0049690 A1 | 3/2004 | Candelore et al. ............. 713/193 |
| 2004/0049691 A1 | 3/2004 | Candelore et al. ............. 713/193 |
| 2004/0049694 A1 | 3/2004 | Candelore ...................... 713/200 |
| 2004/0064688 A1 | 4/2004 | Jacobs |
| 2004/0073917 A1 | 4/2004 | Pedlow, Jr. et al. |
| 2004/0078575 A1 | 4/2004 | Morten et al. ................. 713/176 |
| 2004/0086127 A1 | 5/2004 | Candelore |
| 2004/0088541 A1 | 5/2004 | Messerges |
| 2004/0088552 A1 | 5/2004 | Candelore |
| 2004/0123094 A1 | 6/2004 | Sprunk |
| 2004/0139337 A1 | 7/2004 | Pinder et al. |
| 2004/0141314 A1 | 7/2004 | Vautrin et al. |
| 2004/0158721 A1 | 8/2004 | Candelore |
| 2004/0165586 A1 | 8/2004 | Read et al. ..................... 370/389 |
| 2004/0181666 A1 | 9/2004 | Candelore |
| 2004/0187161 A1 | 9/2004 | Cao ................................ 725/110 |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevois |
| 2005/0169473 A1 | 8/2005 | Candelore |
| 2005/0192904 A1 | 9/2005 | Candelore |
| 2006/0026926 A1 | 2/2006 | Triel et al. |
| 2006/0029060 A1 | 2/2006 | Pister |
| 2006/0112344 A1* | 5/2006 | Ducheneaut et al. .......... 715/758 |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0143655 A1 | 6/2006 | Ellis et al. |
| 2006/0153379 A1 | 7/2006 | Candelore et al. |
| 2006/0168616 A1 | 7/2006 | Candelore |
| 2006/0174264 A1 | 8/2006 | Candelore |
| 2007/0028264 A1* | 2/2007 | Lowe ............................... 725/35 |
| 2008/0127251 A1 | 5/2008 | Wachtfogel et al. |

FOREIGN PATENT DOCUMENTS

| | | |
|---|---|---|
| EA | 0 674 440 | 9/1995 |
| EP | 0471373 | 2/1992 |
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0 674 441 | 9/1995 |
| EP | 0720374 | 7/1996 |
| EP | 0833517 | 4/1998 |
| EP | 0866615 | 9/1998 |
| EP | 1187483 | 3/2002 |
| JP | 7-046575 | 2/1995 |
| JP | 7067028 | 3/1995 |
| JP | 11159162 | 6/1999 |
| JP | 11243534 | 10/2002 |
| JP | 2003330897 | 11/2003 |
| WO | WO8607224 | 12/1986 |
| WO | WO-8902682 | 3/1989 |
| WO | WO 93/09525 | 5/1993 |
| WO | WO-94/10775 | 5/1994 |
| WO | WO 89/02682 | 4/1997 |
| WO | WO9738530 | 10/1997 |
| WO | WO00/31964 | 6/2000 |
| WO | WO0051039 | 8/2000 |
| WO | WO00/59203 | 10/2000 |
| WO | WO 01 11819 | 2/2001 |
| WO | WO 01/26372 | 4/2001 |
| WO | WO01/78386 | 10/2001 |
| WO | WO-2004042516 | 5/2004 |

OTHER PUBLICATIONS

"CLearPlay: The Technology of Choice", from web site, http://www.clearplay.com/what.asp, ClearPlay 2002-2003.
"McCormac Hack Over Cablemodem", *HackWatch*, http://www.hackwatch.com/cablemodbook.html, (Aug. 10, 1998).
"Message Authentication with Partial Encryption", *Research disclosure RD* 296086, (Dec. 10, 1988).
"Metro Media PVR-DVD-MP3-Web", Internet publication from www.metrolink.com, (undated).
"New Digital Copy protection Proposal Would Secure Authorized Copies", *PR Newswire*, (Nov. 13, 1998),1-3.
"Passage Freedom to Choose", *Sony Electronics Inc.*, (2003).
"Pre-Encryption Profiles—Concept Overview and Proposal", *Rev. 1.2 as submitted to the Open CAS consortium on Dec. 28, 2000*.
Agi, Iskender, et al., "An Empirical Study of Secure MPEG Video Transmissions", *IEEE, Proceedings of SNDSS 96*, (1996),137-144.
Alattar, Adnan, et al., "Evaluation of Selective Encryption Techniques for Secure Transmission of MPEG-Compressed Bit-Streams", *IEEE*, (1999),IV-340 to IV-343.
Alattar, Adnan M., et al., "Improved Selective Encryption Techniques for Secure Transmission of MPEG Video Bit-Streams", *IEEE*, (1999),256-260.
Aravind, H., et al., "Image and Video Coding Standards", *AT&T Technical Journal*, (Jan./Feb. 1993),67-68.
Benini, Luca, et al., "Energy-Efficient Data Acrambling on Memory-Processor Interfaces", *ISLPED '03*, Aug. 25-27, 2003, Seoul, Korea,(2003),26-29.
Brown, Jessica, "The Interactive Commercial, Coming Soon to a TV Near You".
Dittmann, Jana, et al., "Multimedia and Security Workshop at ACM Multimedia", Bristol, U.K., (Sep. 1998).
Dondeti, Lakshminath R., et al al., "A Dual Encryption Protocol for Scalable Secure Multicasting", *1999 International Symposium on Computers and Communictions*, Jul. 6-8, 1999.
Gonzalez, R. C., et al., "Digital Image Processing", *Addison Wesley Publishing Company, Inc.*, (1992),346-348.
Gulwani, Sumit, "A Report on Security Issues in Multimedia", *Department of Computer Science and Engineering, Indian Institute of Technology Kanpur*, Course Notes,(Apr. 30, 2000),pp. 10-14.
Haberman, Seth, "Visible World—A High Impact Approach to Customized Television Advertising", (Dec. 2001).
Kim, et al., "Bit Rate Reduction Algorithm for a Digital VCR", *IEEE Transactions on Consumer Electronics*, vol. 37 No. 3 Aug. 1, 1992 ,267-274.
Koenen, Rob H., et al., "The Long March to Interoperable Digital Rights Management", *IEEE*, (2004),1-17.
Kondo, et al., "A New Concealment Method for Digital VCRs", *IEEE Visual Signal Processing and Communication*, Melbourne, Australia,(Sep. 1993),20-22.
Kondo, et al., "Adaptive Dynamic Range Coding Scheme for Future Consumer Digital VTR", 219-226.
Kondo, et al., "Adaptive Dynamic Range Coding Scheme for Future HDTV Digital VTR", *Sony Corporation*, (1991).

(56) References Cited

OTHER PUBLICATIONS

Kunkelmann, Thomas, "Applying Encryption to Video Communication", *Multimedia and Security Workshop at ACM Multimedia '98*. Bristol, U.K., (Sep. 1998),41-47.
Liu, Zheng, et al., "Motion Vector Encryption in Multimedia Streaming", *Proccedings of the 10th International Multimedia Modeling Conference 2004 IEEE*, (2004),1-8.
Lookabaugh, Tom, et al., "Selective Encryption and MPEG-2", *ACM Multimedia '03*, (Nov. 2003).
Menezes, Alfred J., et al., "Handbook of Applied Cryptography", *CRC Press*, 551-553.
Naor, Moni, et al., "Certificate Revocation and Certificate update", Apr. 2000, *IEEE Journal on Selected Areas in Communications, IEEE*, vol. 18, No. 4, (2000),561-570.
NCUBE, "Digital Program Insertion", (May 2001).
NCUBE, "Smooth Ad Insertion Deployment Protects Revenues", (2004).
NHK Laboratories Note, "Error Correction, Concealment and Shuffling", No. 424, (Mar. 1994),29-44.
OPENTV, "OPENTV to Showcase Several Advanced Interactive Television Solutions at IBC 2004", (Sep. 6, 2004).
Park, et al., "A Simple Concealment for ATM Bursty Cell Loss", *IEEE Transactions on Consumer Electronics*, No. 3, (Aug. 1993),704-709.
Park, Joon S., et al., "Binding Identities and Attributes Using Digitally Singed Certificates", *IEEE*, (2000).
Pazarci, Melih, et al., "Data Embedding in Scrambled Digital Video", *Computers and Communication Proceedings, Eighth IEEE International Symposium on 2003*, vol. 1 (ISCC 2003, (2003),498-503.
Piazza, Peter, "E-Signed, Sealed, and Delivered", *Security Management*, vol. 45, No. 4, (Apr. 2001),72-77.
Qiao, Lintian, et al., "Comparison of MPEG Encryption Algorithms", *Department of Computer Science, University of Illinois at Urbana-Champaign*, (Jan. 17, 1998),1-20.
Robert, Amaud, et al., "Digital Cable: The Key to Your Content", *Access Intelligence's Cable Group*, online at http:www.cableworld.com/ct/archives/0202/0202digitalrights.htm, (Feb. 2002).
Rosenblatt, Bill, "Coral Consortium Aims to Make DRM Interoperable", online at http://www.drmwatch.com/standards/article.php/3418741, (Oct. 4, 2004).
Seachange International, "Dynamic-Customized TV Advertising Creation and Production Tools", *Web Site Literature*.
Seachange International "Transport Streams Insertion of Video in the Compressed Digital Domain", *Web Site Literature*, (2000).
Shi, Changgui, et al., "An Efficient MPEG Video Encryption Algorithm", *1998 IEEE, Department of Computer Sciences, Purdue University*, West Lafayette, IN, 381-386.
Spanos, George A., et al., "Performance Study of a Selective Encryption Scheme for the Security of Networked, Real-Time Video", *IEEE*, (1995),2-10.
Taylor, Jim, "DVD Demystified—The Guidebook for DVD-Video and DVD-ROM", *Pub. McGraw Hill*, ISBN: 0-07-064841-7, pp. 134-147, (1993),134-147.
Thawani, Amit, et al., "Context Aware Personalized Ad Insertion in an Interactive TV Environment".
Tom, et al., "Packet Video for Cell Loss Protection Using Deinterleaving and Scrambling", *ICASSP 91: 1991 International Conference on Acoustics, Speech and Signal Processing*, vol. 4, (Apr. 1991),2857-2860.
Wu, Chung-Ping, et al., "Fast Encryption Methods for Audiovisual Data Confidentiality", *SPIE International Symposia on Information Technologies* (Boston, MA., USA), (Nov. 2000),284-295.
Wu, S. Felix, et al., "Run-Time Performance Evaluation for a Secure MPEG System Supporting Both Selective Watermarking and Encryption", *submitted to JSAC special issue on Copyright and Privacy Protection*, (Mar. 1, 1997).
Wu, Tsung-Li, et al., "Selective Encryption and Watermarking of MPEG Video (Extended Abstract)", *International Conference on Image Science, Systems, and Technology, CISST!97*, (Feb. 17, 1997).
Zeng, Wenjun, et al., "Effieienct Frequency Domain Video Scrambling for Content Access Control", *In Proc. ACM Multimedia*, (Nov. 1999).
Zhu, et al., "Coding and Cell-Loss Recovery in DCT-Based packet Video", *IEEE Transactions on Circuits and Systems for Video Technology*, No. 3, NY,(Jun. 3, 1993).
"How Networks Work, Millennium Edition", *Que Corporation*, Sep. 2000,88-89.
Alattar, Adnan, et al., "Evaluation of Selective Encryption Techniques for Secure Transmission of MPEG-Compressed BitStreams", *IEEE*, 1999,IV-340 to IV-343.
Shavik, Kirstnamurthy, "Securant Technologies Delivers Broad PKI Integration to Enable Standards Based Security", *Business Wires*, (Oct. 4, 1999).
U.S. Appl. No. 10/388,002 Office Action, entitled "Mechanism for protecting the transfer of digital content", 1st named inventor: Brant L. Candelore, mailed May 6, 2008.
U.S. Appl. No. 10/691,170 Notice of Allowance mailed Nov. 10, 2008.
U.S. Appl. No. 11/371,568 Office Action mailed Mar. 16, 2009.
PCT Internal Search Report, International Application No. PCT/US00/0511 mailed Apr. 7, 2000.
U.S. Appl. No. 10/388,002 Office Action mailed May 6, 2008.
U.S. Appl. No. 10/388,002 Office Action mailed Nov. 19, 2008.
U.S. Appl. No. 11/371,568 Final Rejection mailed Dec. 2, 2009.
U.S. Appl. No. 10/690,192 Office Action mailed Sep. 24, 2008.
U.S. Appl. No. 10/690,192 Office Action mailed Mar. 4, 2009.
U.S. Appl. No. 10/962,830 Office Action mailed Dec. 11, 2007.
U.S. Appl. No. 10/9602,830 Office Action mailed Jun. 26, 2008.
U.S. Appl. No. 10/962,830 Office Action mailed Oct. 28, 2008.
U.S. Appl. No. 10/962,830 Office Action mailed May 5, 2009.
PCT Internal Search Report and Written Opinion, International Application No. PCT/US05/31171, mailed Oct. 26, 2006.
U.S. Appl. No. 11/371,568 Non-Final Office Action, mailed Apr. 14, 2010.
U.S. Appl. No. 11/371,568, Office Action, mailed Sep. 28, 2010.
U.S. Appl. No. 11/371,568 Non-Final Office Action, mailed Oct. 4, 2011.
U.S. Appl. No. 11/371,568 mailed Jun. 27, 2013.
U.S. Appl. No. 13/079,603 Office Action mailed Jun. 6, 2012.
U.S. Appl. No. 11/371,568 Office Action mailed Jul. 6, 2012.

* cited by examiner

PRIVATE PERSONALIZATION DESCRIPTORS

| PID 1 NAME: JOHN | PID 2 NAME: MARY | PID 3 NAME: SUSAN | ... | PID 100 NAME: BUCK |
| --- | --- | --- | --- | --- |
| PID 101 SEX (MALE) | PID 102 SEX (FEMALE) | PID 103 AGE (3) | ... PID 173 AGE (73) ... | PID 174 ETHNICITY (CAUCASIAN) |
| PID 175 ETHNICITY (HISPANIC) | | | ... | PID 200 ETHNICITY (JAPANESE) |
| ... | ... | ... | ... | ... |

*FIG. 4C*

| PERSONALIZATION CHARACTERISTICS | PRIMARY PIDS | PERSONALIZED CONTENT TO BE RENDERED PERSONALIZED PIDS | PERSONALIZED PIDS |
|---|---|---|---|
| NAME | PID 1 / TOM | PID 2 / MARK | PID 3 / LISA |
| SEX (M/F) | PID 100 / MALE | PID 101 / MALE | PID 102 / FEMALE |
| AGE | PID 101 / 10 | PID 104 / 3 | PID 118 / 18 |
| ETHNICITY | PID 103 / HISPANIC | PID 174 / CAUCASIAN | PID 200 / JAPANESE |
| PERSONAL CHARACTERISTICS | PID 201 / BROWN HAIR | PID 202 / BLOND HAIR | PID 204 / GREEN EYES |

FIG. 8

CONTENT PERSONALIZATION FOR DIGITAL CONTENT

This application is a continuation-in-part of application Ser. No. 10/319,066 filed on Dec. 13, 2002 now U.S. Pat. No. 7,765,567.

BACKGROUND

1. Field

Embodiments of the invention relate to content personalization for digital content. More specifically, one embodiment of the invention relates to an apparatus and method for content replacement in order to personalize digital content.

2. General Background

Television is used to deliver content, such as entertainment and educational programs to viewers. Service providers, such as television stations and networks, broadcast entertainment and information programming via a communications medium, such as a television network or cable system, from the head-end of a communication system to a client or individual user at the receiving end of the system. Traditionally, conventional television broadcasts are typically single programs, movies, or other content that does not provide the opportunity for personalization to a viewer.

In contrast, other types of content are available that may be personalized. For example, some companies may personalize children's books, such as bedtime stories, with a child's name and likeness. The words of the story's and also the likeness of the characters (e.g., gender and ethnicity), may be personalized such that it appears that a particular child has been "written in" to the book as a character.

This sort of personalization is also available in various computer programs in which a user may enter his or her name, age, gender, and ethnicity such that a program for a game or a story will be personalized to the particular user.

Personalization has also occurred for various types of musical compact disks (CDs). For example, a CD full of children's songs may be purchased for a child that has been personalized with a particular child's name such that the child's name is placed in the various songs of the CD.

With the growth of digital television transmitted over satellite, cable, as well as terrestrial networks, there has been a great increase in different channel watching opportunities for viewers. One way in which a service provider network may distinguish itself is by providing personalized content.

Unfortunately, conventional digital video content, such as MPEG video takes the form of a single program, movie, or other content without the opportunity for a service provider to modify the viewing experience for a user by selecting personalized content. Various mechanisms have been proposed for providing personalized content, but typically such proposals have been expensive to implement, take up large amounts of bandwidth, and may require expensive specialized equipment.

BRIEF DESCRIPTION OF THE DRAWINGS

Embodiments of the invention are illustrated by way of example and not by way of limitation in the figures of the accompanying drawings, in which like references indicate similar elements and in which:

FIG. 4C is an exemplary diagram of private personalization descriptors used in the digital data stream.

FIG. 8 is an example of personalized content replacement based upon personalization characteristics.

DETAILED DESCRIPTION

Figure 1:
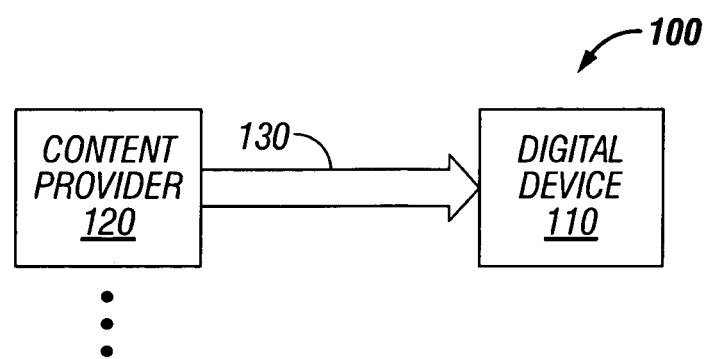
FIG. 1 is an exemplary block diagram of a content delivery system consistent with certain embodiments of the invention.

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention.

For purposes of the present description, the term "digital device" may refer to a television that is adapted to tune, receive, decrypt, descramble and/or decode transmissions from any content provider. Examples of "content providers" may include a terrestrial broadcaster, a cable or satellite television distribution system, or a company providing content for download over the Internet or other Internet Protocol (IP) based networks like an Internet service provider. However, it is contemplated that the digital device may be of another form factor besides a television, such as a set-top box, a personal digital assistant (PDA), a computer, a cellular telephone, a video game console, a portable music player, a stereo system, a personal video recorder, or the like.

In the following description, certain terminology is used to describe features of the invention. For example, in certain situations, the terms "component," "unit" and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic.

An example of "software" includes executable code in the form of an application, an applet, a routine or even a series of instructions. The software may be stored in any type of non-transitory machine readable medium such as a programmable electronic circuit, a semiconductor memory device such as volatile memory (e.g., random access memory, etc.) and/or non-volatile memory (e.g., any type of read-only memory "ROM", flash memory, etc.), a floppy diskette, an optical disk (e.g., compact disk or digital video disc "DVD"), a hard drive disk, a tape, or the like.

In addition, the term "program" generally represents a stream of digital content that is configured for transmission to one or more digital devices for viewing and/or listening. According to one embodiment, the program may contain multiple Packet Identifiers (PIDs) when the program is MPEG (Moving Pictures Expert Group) compliant compressed video. These multiple PIDs provide for replacement of one scene of content for another. The "scene" is defined as one or more frames of content, namely video, images, audio or any combination thereof. For instance, a scene may be one or more frames of video and/or audio, or even a packet of music downloaded into a portable music player.

More specifically, multiple PIDs may be associated with a single program in order to provide content replacement for this program. Content replacement provides an enhanced level of viewing/listening customization.

The content replacement techniques to be hereinafter described can be used to replace primary content with replacement content in order to personalize a program to a user. Content replacement may also be used to provide multiple scenes, endings or other segments for a program, or perhaps to provide multiple views in a sportscast or other program. Other applications for the content replacement techniques of the invention fall within the spirit and scope of the invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described.

Embodiments of the invention relate to content personalization for digital content. More specifically, embodiments of the invention relate to an apparatus and method for content replacement in order to personalize digital content.

Embodiments of the invention relate to a method and apparatus for receiving incoming content including primary content that is content originally intended for use in a program and personalized replacement content that is content for replacing the primary content, wherein, if the personalized replacement content is determined to be more appropriate than the primary content based on personalization parameters, then the primary content is substituted with the personalized replacement content such that a personalized version of the program may be rendered to a viewer.

For example, the received incoming primary and personalized replacement content may be from a digital broadcast stream (e.g. terrestrial, satellite, cable, computer network, Internet, etc.) or, alternatively, or in addition to, may be read from a storage media by a storage device. For example, the storage media may be a compact disk (CD) or a digital video disk (DVD).

In one embodiment, the content may be delivered in a stream of packets and substituting the primary content with the personalized replacement content includes swapping packets. In one example, the packets may be in a MPEG transport stream of packets and may include Internet Protocol (IP) packets. Thus, the content may be delivered in a stream of IP packets. In this embodiment, substituting the primary content with the personalized replacement content includes selecting fields within the IP packets.

As examples, the received personalized replacement content may include audio information such as a name of a character. The received personalized replacement content may also include video content such as a graphical representation of a character for a program (e.g. a cartoon) illustrating a boy or a girl of a particular age or ethnicity depending upon pre-programmed personalization parameters. Thus, pre-programmed personalization parameters may be used relating to a name, sex, age, and ethnicity, as well as various other types of personalization parameters, for an end-user, to personalize a program for the user.

In one embodiment, it is first determined whether personalization functionality is enabled, and, if not, rendering the primary content. However, if personalization functionality is enabled, then it is determined if personalized replacement content is more appropriate than primary content, dependent upon whether there is a match between pre-programmed personalization parameters and personalization descriptors of the personalized replacement content, and if so, then the personalized replacement content is substituted for the primary content.

Using embodiments of the invention various types of stories, such as bedtime stories, cartoon characters, animated strips, and various other types of programs being transmitted in a digital broadcast stream to a television or being read from a CD or DVD may be customized with a name and/or general appearance, as well as other personalized features. For example, personalized content replacement may include a child's name and a general appearance such as an age, sex, and ethnicity. The personalization replacement content techniques to be hereinafter described provide ways of selecting and substituting a user's name, age, sex, ethnicity, as well as a variety of other personalization features.

Referring to FIG. 1, an exemplary block diagram of a content delivery system 100 consistent with certain embodiments of the invention is shown. Content delivery system 100 comprises a digital device 110 that receives digital content such as a program from one or more content providers 120. The program may be propagated as a digital data stream for example in compliance with any data compression scheme. Examples of a data compression scheme include, but are not limited or restricted MPEG standards.

According to one embodiment of the invention, digital device 110 decodes an incoming program, and evaluates the content of the incoming program on a scene-by-scene or program-by-program basis to determine whether personalized replacement content is more appropriate than the primary content based upon pre-programmed personalization parameters, and, if so, substitutes the personalized replacement content for the primary content. These evaluation and substitution schemes are described below.

Content provider 120 provides the digital content to digital device 110 through transmission medium 130, which operates as a communication pathway for the program within content delivery system 100. The transmission medium 130 may include, but is not limited to electrical wires, optical fiber, cable, a wireless link established by wireless signaling circuitry, or the like.

Figure 2:
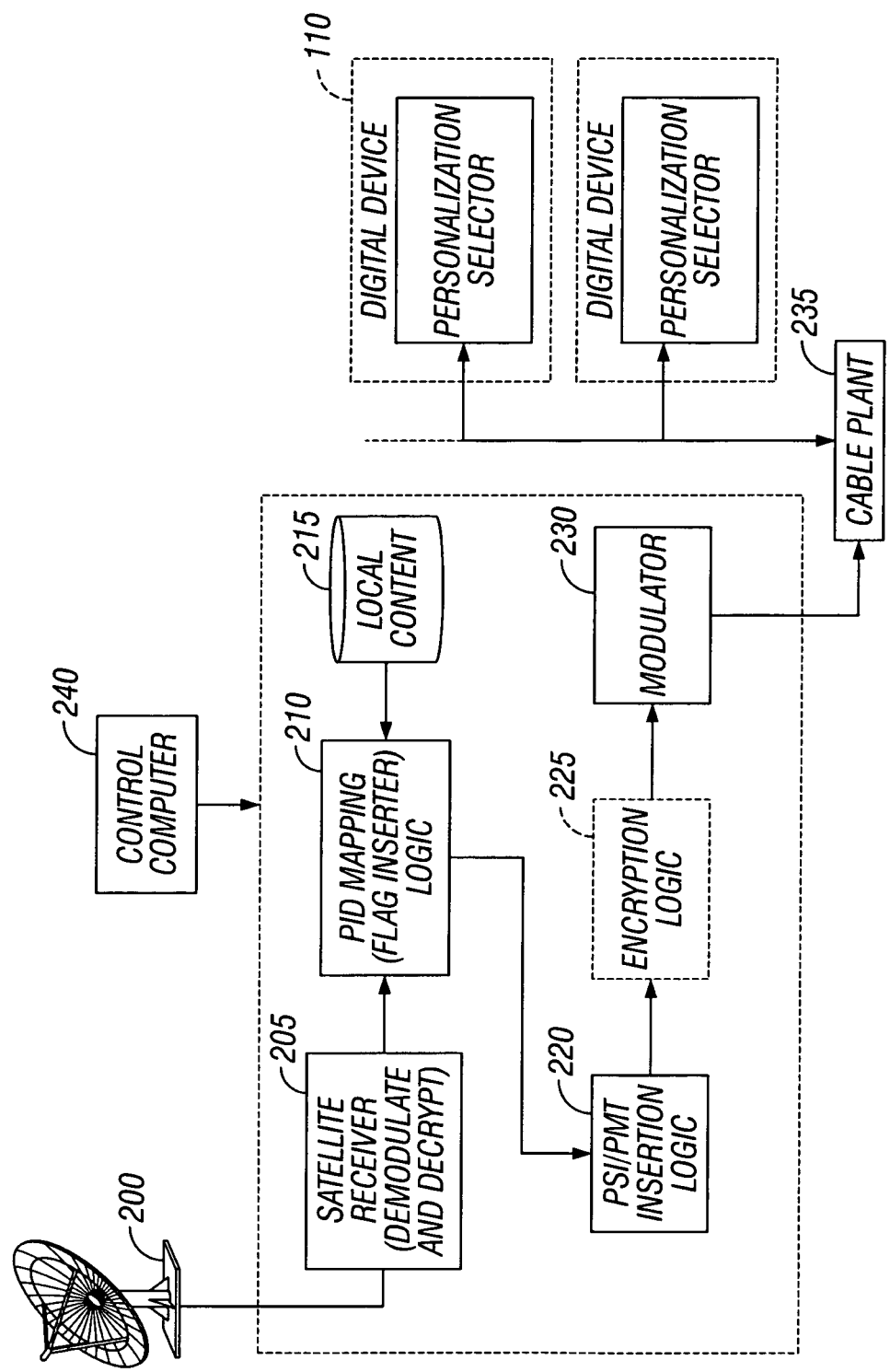
FIG. 2 is an exemplary block diagram of a content provider consistent with certain embodiments of the invention.

Content provider 120 may be adapted with a satellite antenna 200 to receive a multiplexed stream of content from a satellite transmission as shown in FIG. 2. The stream of content is received, demodulated and decrypted at a satellite receiver 205 before being routed to PID Mapping logic 210. The stream of content may include replacement content associated with secondary PIDs. Alternatively, the replacement content may be retrieved from a local content database 215 or other sources of content.

PID mapping logic 210 maps the incoming content from whatever source to a set of primary PIDs and a set of secondary replacement PIDs. The incoming content includes (i) content originally intended for rendering (referred to as the "main or primary content") and (ii) substitution content for various scenes or programs (referred to as "replacement content"). The main content is associated with the primary PIDs and the replacement content is associated with the secondary PIDs. According to this embodiment, PID mapping logic 210 may also be adapted to insert flags (or markers) into the content in order to identify the location where replacement content is to be inserted.

The mapped content then is routed to PSI/PMT insertion logic 220 that inserts Program Specific Information (PSI) and Program Map Tables (PMT) into the content for use by the decoding side in decoding the programming. If the content is to be encrypted, it may optionally pass through encryption logic 225 prior to modulation at a modulator (e.g., a QAM modulator) 230. The modulated stream of content is then transmitted via transmission medium 130 to digital device 110 and perhaps other digital devices. For instance, the modulated stream of content may be routed to via a cable plant 235 to digital device 110 residing with the end users. The operation performed by content provider 120, including but not limited to the PID mapping for content replacement, is carried out under control of a control computer 240.

In general, a system can be used to form a content substitution encoder consistent with certain embodiments of the invention in which input data inclusive of main content and replacement content. PID mapping logic 210 assigns a primary PID to the main content and assigns a secondary PID to the replacement content. Private data to identify the main content by the primary PID and replacement content by the secondary PID, along with the main content mapped to the primary PID and the replacement content mapped to the secondary PID, are assembled into a data stream.

Figure 3:
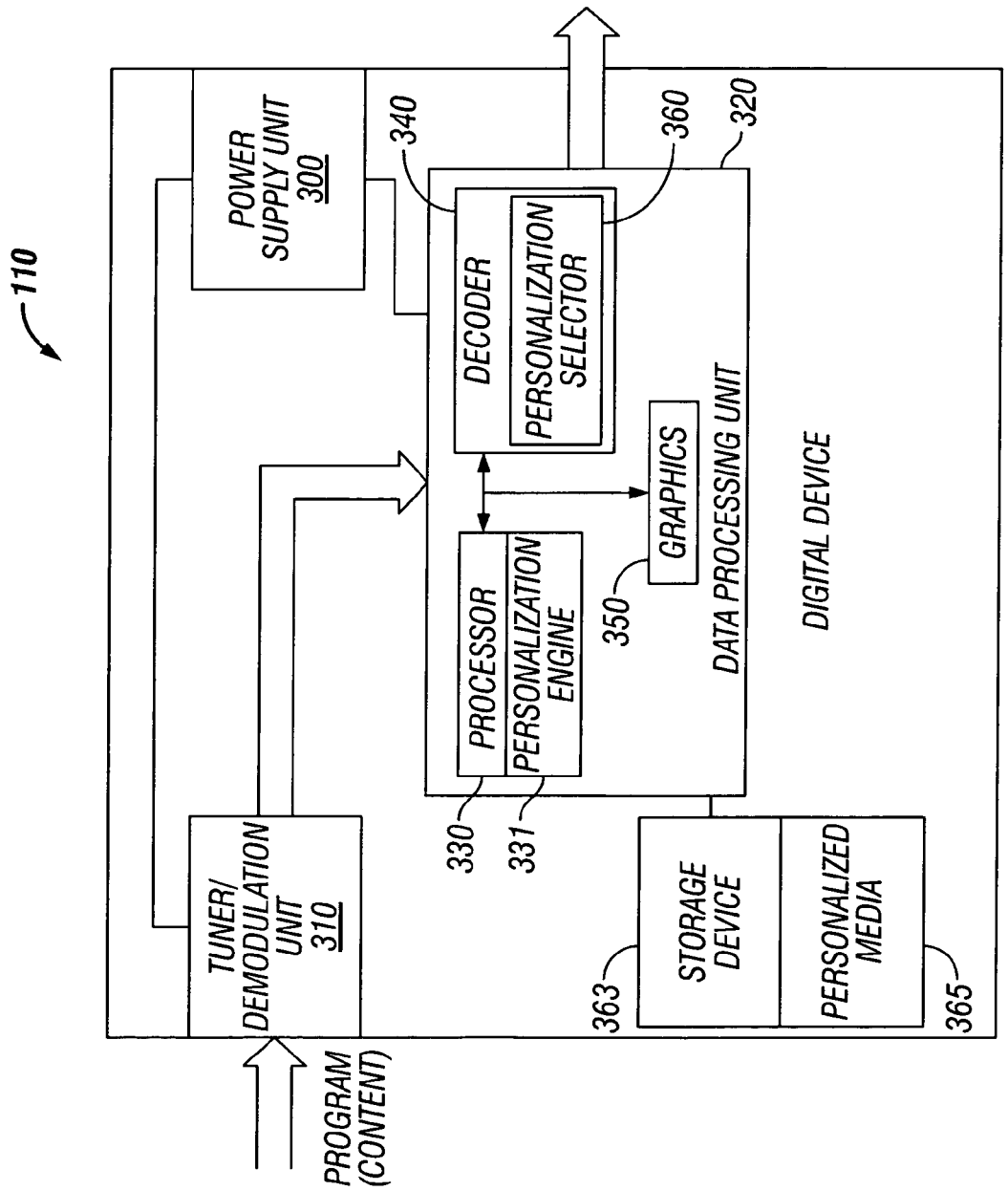
FIG. 3 is an exemplary diagram of a digital device including personalization selection features of the content delivery system of FIG. 1.

Referring now to FIG. 3, an exemplary diagram of digital device 110 of the content delivery system 100 is shown. Digital device 110 comprises a power supply unit 300, network interfaces, such as a tuner/demodulation unit 310, and data processing unit 320. Power supply unit 300 is adapted to provide powered to tuner/demodulation unit 310 and data processing unit 320. Power supply unit 300 may provide regulated power based on input power received from a wall socket (e.g., 110 volts alternating current "VAC", 220 VAC, etc.). Tuner/demodulation unit 310 tunes to a channel to receive the program and demodulates an incoming program to recover the content. Then, the content is routed as a digital bit stream to data processing unit 320.

Data processing unit 320 comprises a processor 330 (e.g., central processing unit), a decoder 340 and a graphics component 350. These components may be implemented as separate integrated circuits or as a single integrated circuit (system-on-chip implementation) as shown.

According to one embodiment of the invention, decoder 340 is implemented with a personalization selector 360 that is adapted to alternatively select personalized replacement content during playback of video and/or audio. In general, according to one embodiment of the invention, personalization selector 360 is designed to select alternate PID(s) from the digital bit stream based on findings by processor 330, which accesses meta data in Adaptation fields within MPEG packets to obtain information for use in evaluating whether to replace primary content in a scene or program with personalized replacement content based on pre-programmed personalization parameters.

Further, in conjunction with the personalization selector 360, processor 330 may implement a personalization engine 331 that may be utilized in selecting appropriate replacement content to be substituted for primary content.

Particularly, in one example, the personalization engine 331 may be a software or firmware module implemented by processor 330 that can be pre-programmed by a user to pre-set personalization features such that appropriate replacement content is selected and substituted for primary content so that digital content may be personalized for the user. Examples of these personalization features may include a user's: name, sex, age, ethnicity, location, and other personal characteristics. It should be appreciated that this list is by no means exhaustive and that any type of personalization characteristic may be pre-programmed into the digital device.

Thus, in one embodiment, processor 330 operating with a personalization engine 331 in conjunction with the personalization selector 360 of decoder 330 may determine if personalized replacement content is more appropriate than primary content based upon the pre-programmed personalization parameters of the personalization engine 331, and, if so, the personalization selector 360 may substitute the primary content with the personalized replacement content if the replacement content is determined to be more appropriate.

Additionally, digital device 110 may include a storage device 363 that may store personalized media 365. In one embodiment, the storage device 363 may be a hard disk drive that may store content that can be processed by the data processing unit in order to render programs and that further replaces personalized replacement content with primary content, as previously discussed. Additionally, storage device 363 may be a compact disk ROM (CD-ROM) or a digital video disk (DVD) player that may read a CD or a DVD. In one embodiment, the CD, hard disk drive, or DVD may store a wide variety of personalized replacement content that can be processed by the processor 330 and personalization selector 360 of the decoder 330 in order to substitute the primary content with personalized replacement content, if the personalized replacement content is determined to be more appropriate, for any given program played by the CD-ROM or DVD.

Thus, the personalization selector and personalization features, according to embodiments of the invention, may be utilized with either a broadcast stream or a pre-recorded media such as a DVD or CD-ROM.

In one embodiment, the content may be delivered in a stream of packets and substituting the primary content with the personalized replacement content includes swapping packets. In one example, the packets may be in a MPEG transport stream of packets and may include Internet Protocol (IP) packets. Thus, the content may be delivered in a stream of IP packets. In this embodiment, substituting the primary content with the personalized replacement content includes selecting fields within the IP packets.

Graphics component 350 is adapted for rendering on-screen menus or guide data. For instance, processor 330 may be adapted to collect guide data and for storage of such guide data in local memory (not shown). When such data is requested, it is displayed by graphics component 350, which would overlay video concurrently displayed. Also, graphics component 350 may be adapted to distort or blank out displayed images.

Figure 4A:
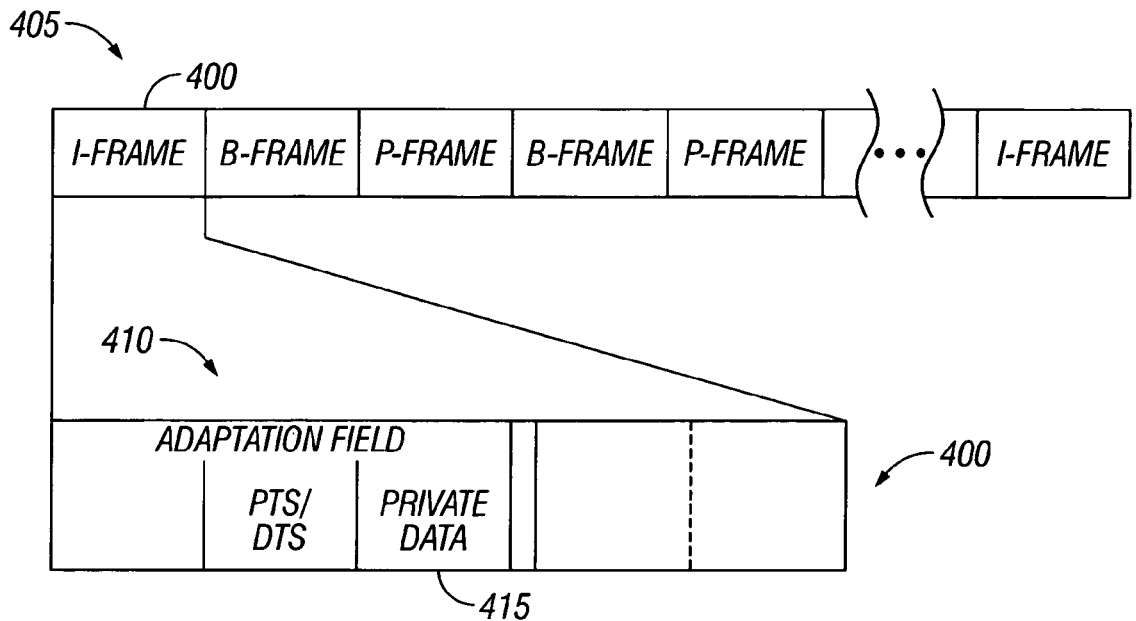
FIGS. 4A and 4B are exemplary diagrams of an Adaptation field of an I-frame, being a portion of a MPEG packet of the digital data stream.
Figure 4B:
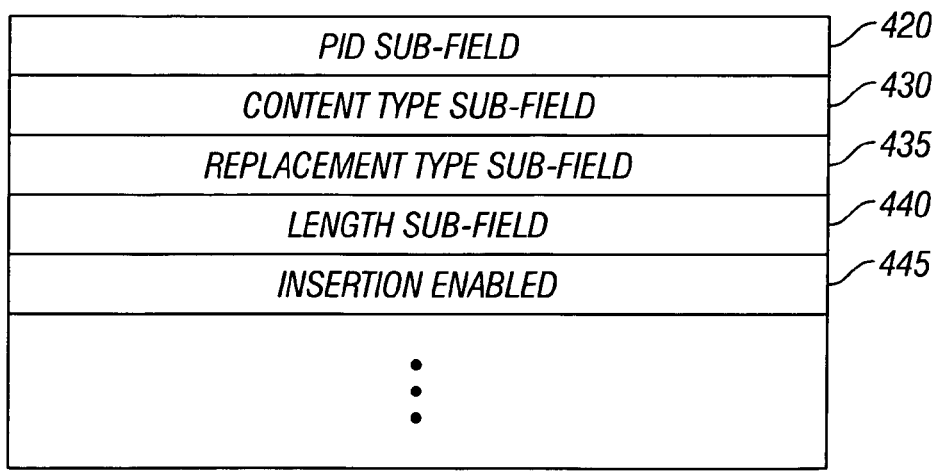

Referring to FIGS. 4A and 4B, exemplary diagrams of an Adaptation field 410 of an I-frame 400, being a portion of a MPEG packet 405 of the digital data stream is shown. As previously discussed this digital data stream (e.g., an IP data stream including IP packets) may come from a digital broadcast stream or from pre-recorded media such as a CD or DVD. Adaptation field 410 features control information 415 (also referred to as "private data") to initiate a content replacement operation.

According to one embodiment of the invention, the Adaptation field 410 includes control information 415 used by processor 330 and decoder 340 of FIG. 3 to (i) determine if content replacement is enabled or disabled and (ii) evaluate whether personalized replacement content should be substituted for primary content. Thus private data includes primary content as well as secondary personalized replacement content. Such evaluation is conducted ahead of any scheduled rendering (playback for visual or audible perception) of scenes or programs of digital content.

The Adaptation field 410 includes control information 415 that features a plurality of sub-fields, including but not limited or restricted to one or more of the following: (1) PID sub-field 420, (2) Content type sub-field 430; (3) Replacement type sub-field 435; (4) Length sub-field 440; (5) Insertion Enabled sub-field 445; and (6) Tag sub-field 450.

As illustrated in FIG. 4B, the PID sub-field 420 is adapted to identify what PIDs are provided for a scene or program started by I-frame 400. These PIDs may include a single (Primary) PID where no replacement content is available, and/or one or more secondary PIDs (e.g., PID-2, PID-3, etc.) to identify personalized replacement content.

Content type sub-field 430 identifies the type of content associated with I-frame 400 and the scene or program associated with I-frame 400. For instance, content type sub-field 430 may identify the content as a movie, a television series, a cartoon, a children's program, a news clip, a live entertainment event such as a concert, etc. This information is used to allow personalization selector 360 of FIG. 3 to substitute personalized replacement content for primary content, if it is determined that the personalized replacement content is more appropriate, based upon pre-programmed personalization parameters.

Replacement type sub-field 435 identifies the type of replacement scheme available. For instance, the replacement scheme may involve full scene replacement or inter-scene data replacement (e.g., pixel obfuscation, pixel replacement, audio muting, audio insertion, etc.) to reduce transmission bandwidth requirements.

Length sub-field 440 identifies the number of frames (I, B, P) associated with the length of the digital data stream forming the content.

Insertion enabled sub-field 445 indicates whether or not personalized replacement content insertion is enabled.

Referring to FIG. 4C, an exemplary diagram of private personalization descriptors and associated PIDs in the adaption field are illustrated. It should of course be appreciated that these are only examples of different types of private personalization descriptors that may be utilized.

As shown in FIG. 4C as an example, PIDs are packet identifier personalization descriptors to identify well-known different male and female names such as John, Mary, Susan, Buck, that may be utilized as replacement content for personalization or as primary content. Associated content for these PIDs may include the audio version of the name and/or a graphical presentation of the name.

Further, as shown, PID 101 and PID 102 may include a personalization descriptor of the sex of the user such as male or female that may be used as replacement content for personalization or as primary content. Similarly, as shown PIDs 103-173 may include various personalization descriptors related to age, such as ages 3-73. Moreover, personalization descriptors related to the ethnicity of a user, such as PIDs 174-200 may include such ethnicities as Caucasian, Hispanic, Japanese, etc.

It should be appreciated that this is just one example of personalization descriptors that may be used, and that a wide variety of different personalization descriptors may be put into a digital broadcast stream or read from a storage media, and this example is by no means exhaustive but only illustrative.

Figure 5:
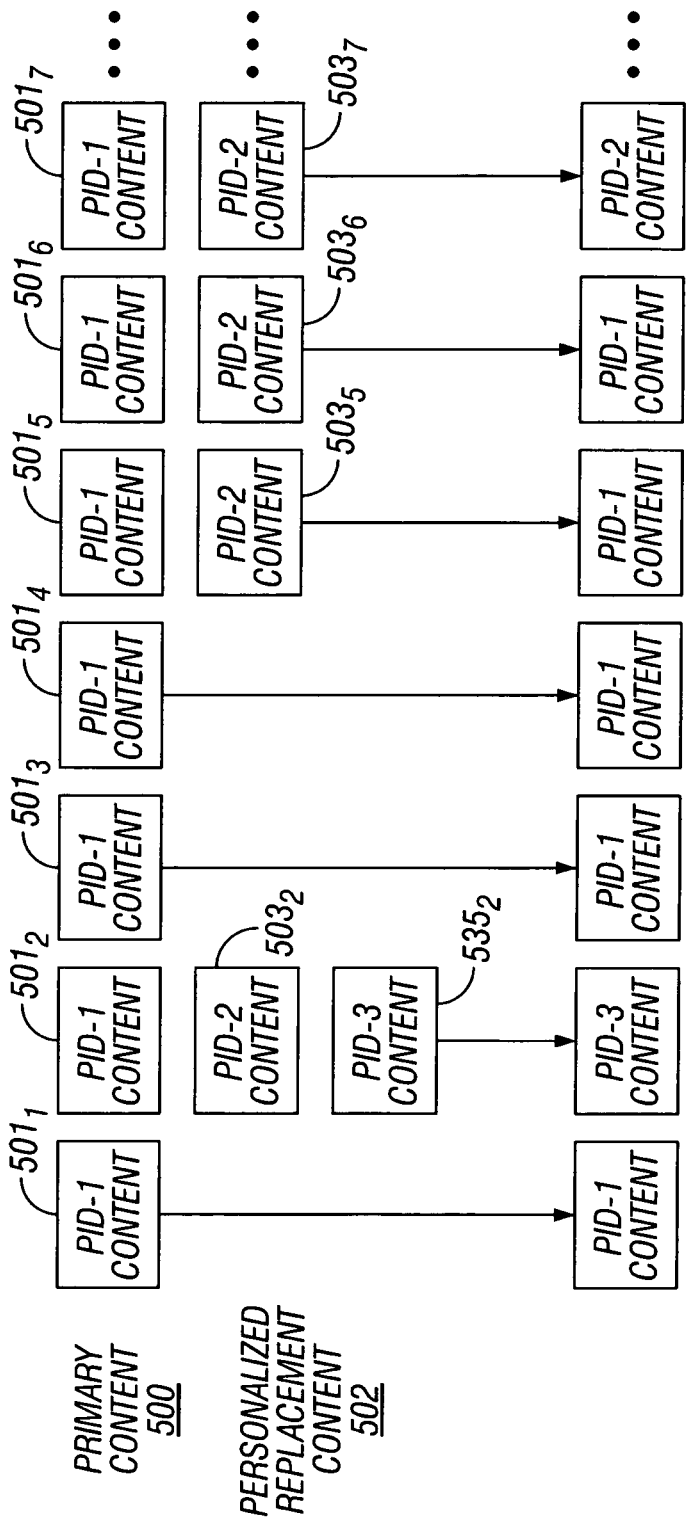
FIG. 5 is an exemplary diagram of a first embodiment of a personalization content replacement process consistent with certain embodiments of the invention.

Referring now to FIG. 5, an exemplary diagram of an embodiment of a content replacement process consistent with certain embodiments of the invention is shown. For this embodiment, main or primary content 500 may be formed by a plurality of primary content segments 5011-501N (where N>1), which are associated with corresponding primary PIDs (PID-1) and are loaded into personalization selector 360 of FIG. 3. Replacement content 502, namely personalized replacement content segments 5032, 5035-5037 & 5352 associated with certain secondary personalization replacement PIDs (PID-2, and PID-3), is also provided to the personalization selector.

For example, as shown in FIG. 5, in some instances primary content segments PID-1 (e.g. indicating a name) 5011, 5041, 5015, and 5016 may be utilized. This may be because personalization for replacement content is not enabled or the replacement content is not anymore appropriate than the original primary content. For example, if the primary content associated with PID-1 is the name Jack in a cartoon story, and personalization is not enabled, then the name Jack is simply utilized in the cartoon.

In other instances, when personalization is enabled replacement content may be utilized instead of primary content 5012 and 5017. As illustrated in FIG. 5, personalized replacement content segments 5352 and 5037 may be substituted for primary content segments 5012 and 5017, respectively, if they are determined to be more appropriate than the primary content.

As an example, assuming PID-1 5012 content is the name Jack, whereas the PID-3 content 5352 is for the name Jill, and Jill is the name entered as a pre-programmed personalization parameter in the digital device, then the personalization selector 360 will select PID-3 5352 to insert the audio name Jill into a program, such as a cartoon, so that the cartoon is personalized.

It should be appreciated that a wide variety of different types of personalization parameters may be utilized.

Thus, embodiments of the present invention relate to a digital device 110 receiving incoming content including primary content that is content originally intended for use in a program (e.g. PID-1 content) and personalized replacement content (e.g. PID-2 and PID-3 content) for potentially replacing the primary content in the program. The personalization selector 360 of decoder 340 in conjunction with the personalization engine 341 operated by processor 330 may substitute the primary content with the personalized replacement content, if the personalized replacement content is determined to be more appropriate, based upon pre-programmed personalization parameters.

In one embodiment, the incoming primary and personalized replacement content may be from a digital broadcast stream, as previously discussed. In another embodiment, the incoming primary and personalized replacement content may be read from personalized storage medium 365 (e.g. a CD or DVD) by a storage device 363 (e.g. a CD or DVD drive).

The primary content and personalized replacement content may take many forms, such as, audio or video information for a name, sex, age, ethnicity, or other personal characteristics of a character as well as other types of program personalization. Particularly, these types of personalization characteristics may be selected based upon pre-programmed personalization parameters for a user including at least one of a name, sex, age, and/or ethnicity.

More particularly, the personalization selector 360 in conjunction with the personalization engine 331 of processor 330 may determine if the personalized replacement content is more appropriate than the primary content by determining if there is a match between pre-programmed personalization parameters and personalization descriptors of the personalized replacement content contained in the PIDs of the digital stream, as previously discussed.

As one example, a child's name and a child's general appearance may be customized in a bedtime story, cartoon, animated strip, video, etc. As previously discussed, customization can occur by utilizing personalized replacement content contained in the digital content stream received from either a digital broadcast stream or from a CD or DVD.

It should be appreciated that audio words do not take up much bandwidth whereas visual aspects, such as, skin color, hair color, eye color, and sex (e.g. male or female) take up relatively more bandwidth. Further, it should be appreciated that synthetic video (such as cartoons) do not require as much bandwidth as real video.

Therefore, it should be appreciated by those with skill in this art that suitable design considerations, as to bandwidth, should be taken into account with respect to the amount of replacement content to be utilized for a given program and/or whether the digital content is coming from a video broadcast stream and/or personalized media such as a CD or DVD.

Particularly, by using separate audio and video segments placed in packets marked with different secondary personalized replacement PIDs, as previously discussed, an efficient method (based upon a user's pre-programmed personalization parameter) is provided to select appropriate personalized audio and video content for rendering to a user having a digital device.

Although a cartoon or video utilizing a personalized name and general appearance of a child has been given as an example above, it should be appreciated that other applications such as training videos where people may like to see people of their own ethnicity are also possible with the previously-described embodiments of the invention. Moreover, it should be appreciated that almost any type of audio and/or video replacement content may be utilized with the embodiments of the invention. For example, it should be appreciated that the appearance of a person may be rendered by simply substituting appropriate macro-blocks or by using graphics overlay to modify an exposed face, skin, and hair color.

Figure 6:
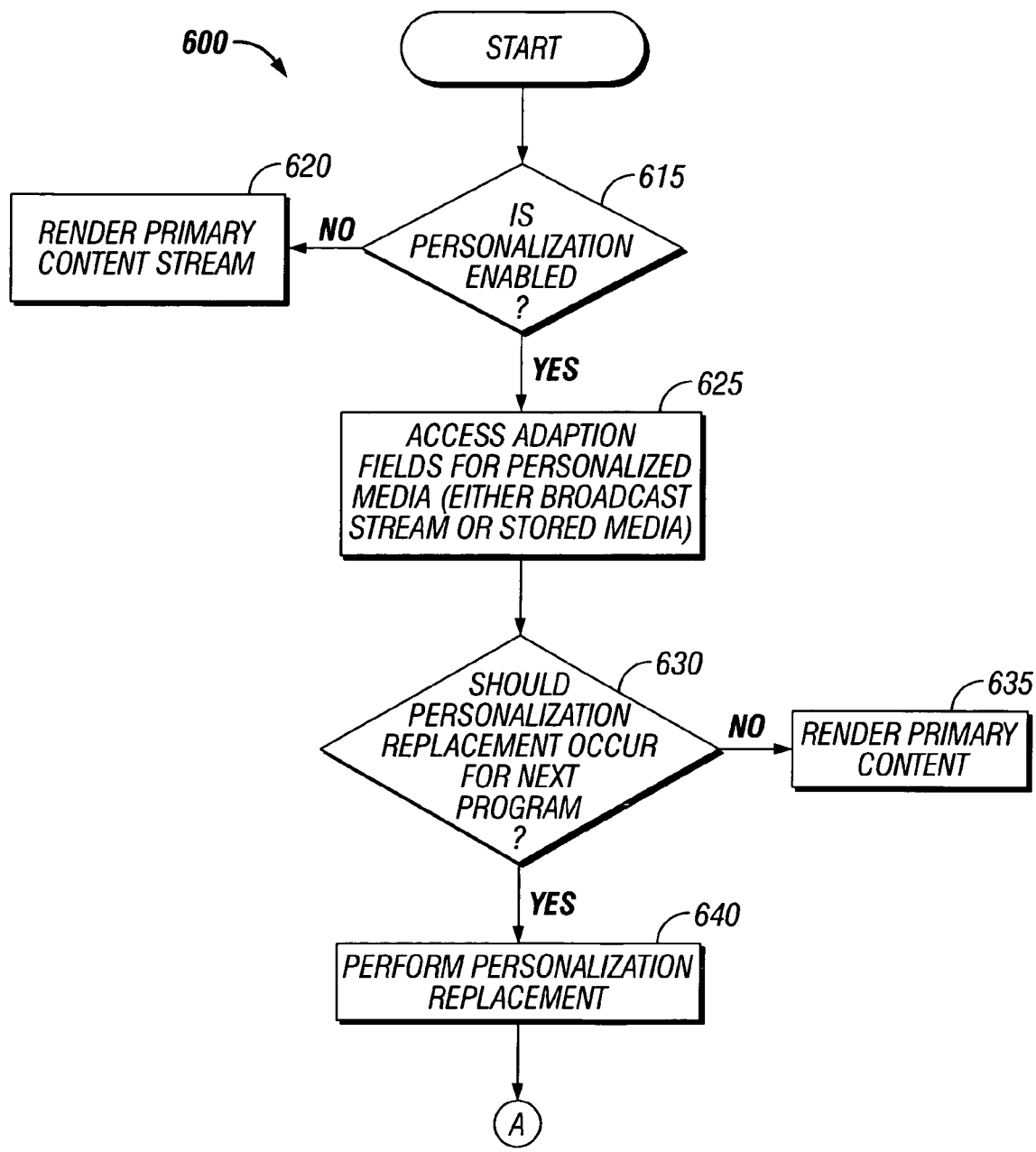
FIG. 6 is an illustrative flowchart of a process for determining whether personalized content replacement should be performed.

Referring now to FIG. 6, FIG. 6 is a flow diagram of a process 600 for determining whether personalization content replacement should be performed. At decision block 615, if it is determined that personalization is not enabled, then the process 600 renders the primary content from the digital stream (block 620). However, if personalization is enabled, then the adaption fields of the digital stream (e.g. either digital broadcast stream or stored media digital stream) are accessed to determine potential personalized replacement content (block 625). Whether personalization is to be enabled may be set by either the digital device and/or the digital content stream Next, at decision block 630, it is determined whether personalization replacement should occur for the next program. If not, at block 635, the digital device 110 renders the primary content. However, if personalization replacement can occur for the next program (or the next scene of a program) then personalization replacement is performed (block 640).

Figure 7:
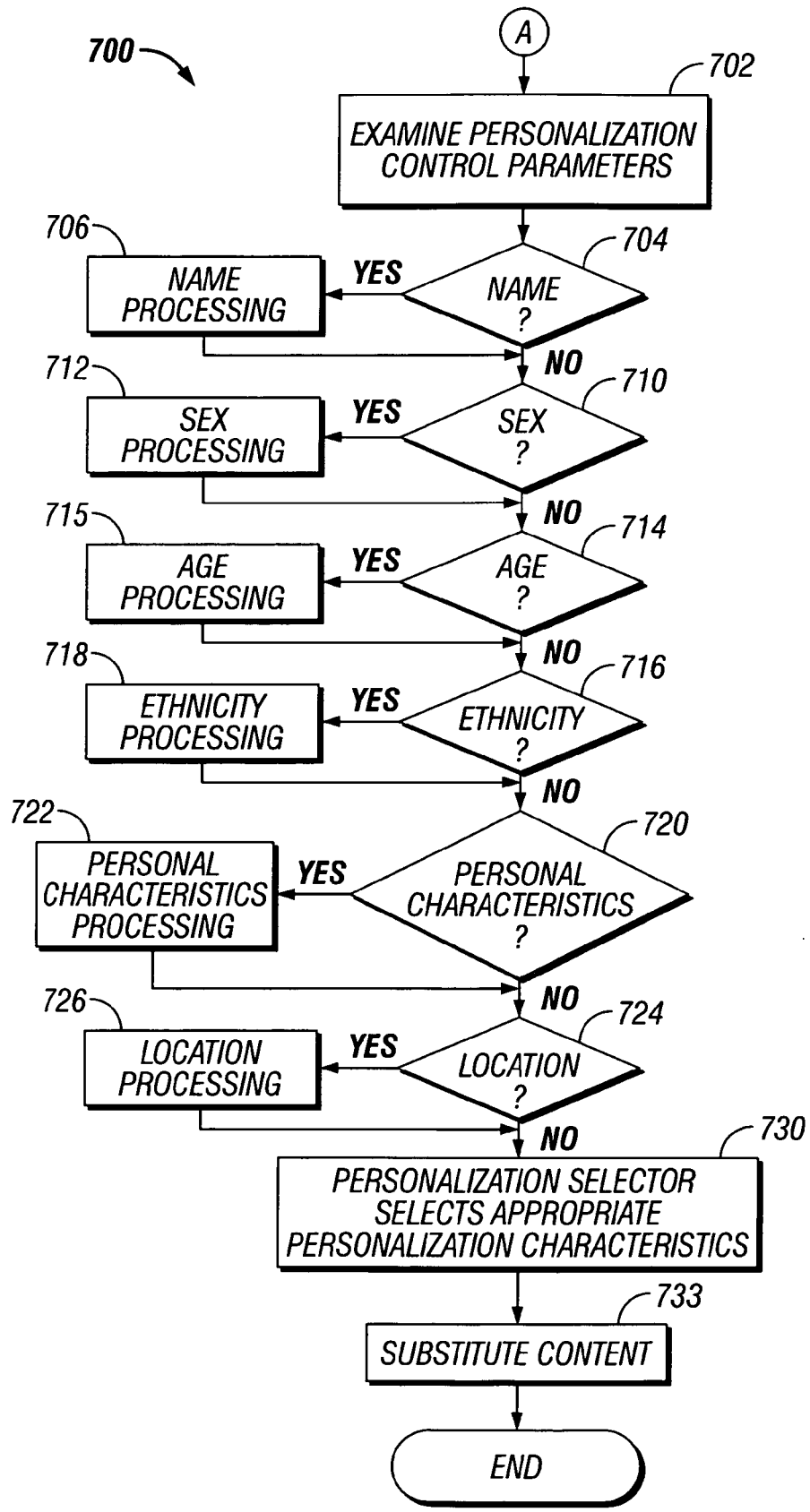
FIG. 7 is an illustrative flowchart of a process for selecting appropriate personalization characteristics.

Moving to FIG. 7, FIG. 7 is a flow diagram illustrating a process 700 for selecting and substituting appropriate personalized replacement content based upon personalization characteristics.

At block 702, the personalization selector 360 examines pre-programmed personalization parameters from the personalization engine in order to select possible replacement content.

For example, at decision block 704 it is determined whether a name is a pre-programmed personalization parameter. If so, at block 706, name processing is performed to determine if appropriate name replacement content from the digital stream can be selected. Next, at decision block 710, it is next determined whether sex (male or female) is a pre-programmed personalization parameter. If so, at block 712, sex processing is performed to determine if appropriate male or female personalized replacement content can be selected.

Further, at decision block 714, it is determined whether age is a pre-programmed personalization parameter. If so, at block 715 age processing is performed to determine if appropriate personalized age replacement content can be selected.

At block 716, it is next determined whether ethnicity is a pre-programmed personalization parameter. If so, at block 718, ethnicity processing is performed to determine if there is appropriate personalization replacement content for ethnicity that can be selected. Then, at block 720, it is next determined whether there are other pre-programmed personal characteristics. If so, at block 720 personal characteristic processing is performed to determine if personalized replacement content appropriate for the personal characteristics that have been pre-programmed can be selected.

At block 724, it is next determined whether location is a pre-programmed personalization parameter. If so, at block 726 location processing is performed to determine if there is appropriate location replacement content that can be selected.

It should be appreciated that the above list is only an example of personalization parameters, and is not exhaustive, and that a wide variety of different types of personalization parameters may be utilized.

At block 730, the personalization selector 360 in conjunction with the processor selects appropriate personalization characteristics based upon the pre-programmed personalization characteristics and the personalization replacement content contained in the digital stream, based upon the above-described processing.

Then, at block 733, the personalization selector substitutes the personalized replacement content, deemed to be more appropriate than the primary content, for the primary content such that a personalized program is rendered to the user.

A very general example will be given with reference to FIG. 8. FIG. 8 is an example wherein the personalization engine has pre-programmed personalization characteristics for name, sex, age, ethnicity, and personal characteristics. In this example, the program being broadcast to the digital device is a cartoon having primary PIDs for a cartoon character corresponding to: name, Tom; sex, male; age, 10, ethnicity, Hispanic; personal characteristics, hair=brown.

The personalization characteristics programmed into the personalization engine are for a female, named Lisa, who is three years old, Caucasian, and who has blond hair and green eyes.

With this set-up, the personalization selector will determine which personalization replacement content is more appropriate than the primary content, based upon the pre-programmed personalization parameters. Particularly, the personalization selector will substitute the primary content of Tom, male, 10, Hispanic, brown hair with the personalized replacement content that has been determined to be more appropriate by selecting the personalization content for Lisa PID 3, Female PID 102, age 3 PID 104, Caucasian ethnicity PID 174, and blond hair PID 202, and green eyes PID 204.

Thus, the personalization selector will substitute this primary content with the personalized content selected from the personalized replacement content of the digital stream, such that a cartoon that is personalized to reflect the user based upon their particular characteristics pre-programmed into the digital device.

It should be appreciated that the above is just one example and that an almost infinite amount of variations to personalize the content of a program be it audio, visual, cartoons, T.V. shows, static animation, movie animation, computer programs, or any sort of audio and/or visual content that is capable of digital representation can be performed with the previously-described apparatus and methods.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. A digital device implemented method of providing personalized content comprising:
    receiving incoming content including primary content being content originally intended for use in a program designated with packet identifiers (PIDs) for packets and personalized replacement content being content for replacing the primary content in the program designated with replacement PIDs for packets, wherein the received incoming primary content and personalized replacement content is received from a digital broadcast stream;
    determining if the personalized replacement content is more appropriate than the primary content based upon personalization parameters, wherein the personalization parameters include name, sex, and age; and
    if personalization functionality is enabled, substituting the primary content including a name PID, a sex PID, and an age PID with the personalized replacement content including a replacement name PID including audio information, a replacement sex PID, and a replacement age PID if the personalized replacement content is determined to be more appropriate to create a complete personalized program for a user such that the personalized replacement content is displayed or played to a user in video and audio format, respectively.

2. The method of claim 1, further comprising determining whether personalization functionality is enabled, and, if not, rendering the primary content.

3. The method of claim 2, wherein determining if personalized replacement content is more appropriate than primary content includes determining if there is a match between personalization parameters and personalization descriptors of the personalized replacement content.

4. The method of claim 3, wherein the personalization parameters are preprogrammed.

5. An apparatus to provide personalized content comprising:
    a tuner/demodulation unit adapted to receive incoming content including primary content being content originally intended for use in a program designated with packet identifiers (PIDs) for packets and personalized replacement content being content for replacing the primary content in the program designated with replacement PIDs for packets, wherein the received incoming primary content and personalized replacement content is received from a digital broadcast stream; and
    a data processing unit including a personalization selector coupled to the tuner/demodulation unit, the personalization selector to determine if the personalized replacement content is more appropriate than the primary content based upon personalization parameters, wherein the personalization parameters include name, sex, and age, and
    if personalization functionality is enabled to substitute the primary content including a name PID, a sex PID, and an age PID with the personalized replacement content including a replacement name PID including audio information, a replacement sex PID, and a replacement age PID if the personalized replacement content is determined to be more appropriate to create a complete personalized program for a user such that the personalized replacement content is displayed or played to a user in video and audio format.

6. The apparatus of claim 5, wherein the data processing unit further determines whether personalization functionality is enabled, and, if not, renders the primary content.

7. The apparatus of claim 6, wherein the personalization selector determines if personalized replacement content is more appropriate than primary content by determining if there is a match between personalization parameters and personalization descriptors of the personalized replacement content.

8. The apparatus of claim 7, wherein the personalization parameters are pre-programmed.

9. A non-transitory machine-readable medium of a storage device to tangibly store instructions, that if executed by logic, will cause a digital device to perform the following operations to provide personalized content comprising:
    receiving incoming content including primary content being content originally intended for use in a program designated with packet identifiers (PIDs) for packets and personalized replacement content being content for replacing the primary content in the program designated with replacement PIDs for packets, wherein the received incoming-primary content and personalized replacement content is received from a digital broadcast stream;
    determining if the personalized replacement content is more appropriate than the primary content based upon personalization parameters, wherein the personalization parameters include name, sex, and age; and
    if personalization functionality is enabled, substituting the primary content including a name PID, a sex PID, and an age PID with the personalized replacement content including a replacement name PID including audio information, a replacement sex PID, and a replacement age PID if the personalized replacement content is determined to be more appropriate to create a complete personalized program for a user such that the personalized replacement content is displayed or played to a user in video and audio format.

10. The non-transitory machine-readable medium of claim 9, further comprising
instructions to determine whether personalization functionality is enabled, and, if not, rendering the primary content.

11. The non-transitory machine-readable medium of claim 10,
wherein determining if personalized replacement content is more appropriate than primary content includes determining if there is a match between personalization parameters and personalization descriptors of the personalized replacement content.

12. The non-transitory machine-readable medium of claim 11,
wherein the personalization parameters are pre-programmed.

* * * * *